(12) United States Patent
Childress et al.

(10) Patent No.: US 6,862,649 B2
(45) Date of Patent: Mar. 1, 2005

(54) BEHAVIORAL TRANSLATION OF DATALINK MESSAGES BETWEEN DIFFERENT PROTOCOLS AND PLATFORMS

(75) Inventors: Jeremy D. Childress, Carterville, IL (US); Steven A. Lien, Wildwood, MO (US); Thomas H. Rogge, Ballwin, MO (US); Paul L. Tipton, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 419 days.

(21) Appl. No.: 10/165,630

(22) Filed: Jun. 7, 2002

(65) Prior Publication Data

US 2003/0229603 A1 Dec. 11, 2003

(51) Int. Cl.[7] .......................... G06F 13/00; G06F 13/14; H04J 3/16
(52) U.S. Cl. ...................... 710/315; 710/100; 710/305; 370/466; 370/467
(58) Field of Search ................................ 710/315, 100, 710/305; 370/466–467, 395.5

(56) References Cited

U.S. PATENT DOCUMENTS

| | | | | |
|---|---|---|---|---|
| 5,524,141 A | * | 6/1996 | Braun et al. ............. 379/93.25 |
| 5,732,074 A | * | 3/1998 | Spaur et al. ................ 370/313 |
| 5,883,586 A | | 3/1999 | Tran et al. | |
| 6,396,833 B1 | * | 5/2002 | Zhang et al. ............... 370/392 |

* cited by examiner

*Primary Examiner*—Tim Vo

(57) ABSTRACT

The digital communication system (DCS) provides communication between users utilizing digital communication protocols. The DCS includes a first protocol interface system in communication with a first user for identifying a first message type of a first message being passed between the first user and the first protocol interface system. A second protocol interface system is in communication with a second user for identifying a second message type of a second message being passed between the second user and the second protocol interface system. A behavioral translator is in communication with the first protocol interface system and the second protocol interface system for receiving messages from either the first or the second protocol interface system. The behavioral translator performs behaviors sufficiently consistent with the users, based on the identifications of the first and second message types, so as to provide substantially seamless communication between the users.

21 Claims, 5 Drawing Sheets

BEHAVIORAL TRANSLATION OF DATALINK MESSAGES BETWEEN DIFFERENT PROTOCOLS AND PLATFORMS

BACKGROUND OF THE INVENTION

1. Field of the Invention

The present invention relates to digital communication systems and more particularly to a digital communication system that maintains an awareness of the behavior of each user.

2. Description of the Related Art

Over time, a variety of digital data communications links have been developed, and will continue to be developed. Each link typically uses a single protocol, with some set of messages and fields associated with that protocol. Users of these links typically determine how to make use of the messages and fields within the protocol being used. This results in users that are unable to communicate with each other due to differences in the protocols involved, the message sets involved, and/or the fields involved. In situations where cooperation between users is useful and necessary, they have no means of sharing digital information. Although efforts are underway to create common standards for digital communication between platforms, there is still the need to support digital communication between existing platforms using existing protocols.

U.S. Pat. No. 5,883,586, issued to Tran et al, discloses an embedded mission avionics data link system which allows an aircraft to receive, transmit, and process a variety of different types of information. The system has the capability of generating and receiving video information for viewing by a pilot in the cockpit. The system also requests, receives and recognizes situation awareness data as well as mission update data and processes this information accordingly. Any video images received by the pilot either externally or internally may be annotated and either stored in memory or transmitted externally. The system allows multiple aircraft on a mission to stay in constant communication as to relative positions to each other and targets, provide up-to-date information as to the situation that exists at the target, and do this in a mostly automatic fashion that reduces the workload of the pilot and enhances the mission capability.

SUMMARY

The digital communication system (DCS) of the present invention provides communication between users utilizing digital communication protocols. The DCS includes a first protocol interface system in communication with a first user for identifying a first message type of a first message being passed between the first user and the first protocol interface system. A second protocol interface system is in communication with a second user for identifying a second message type of a second message being passed between the second user and the second protocol interface system. A behavioral translator is in communication with the first protocol interface system and the second protocol interface system for receiving messages from either the first or the second protocol interface system. The behavioral translator performs behaviors sufficiently consistent with the users, based on the identifications of the first and second message types, so as to provide substantially seamless communication between the users.

The behavioral translator of the present invention provides options available for the processing of a message format in one protocol. These options include ignoring the message (generally not the ideal case, but sometimes necessary), translating the message into a format of another protocol (as performed by existing algorithms), automatically generating and sending a response, simulating the receipt of some other message to invoke the desired behavior on the receiving end, or some combination of some or all of these options.

On a fighter aircraft platform, for example, there are a number of factors that make it preferable for the algorithm to be automated and to operate seamlessly with existing mission software (that is, to simulate an existing data link so the mission software can process the data as if it is really coming from that existing data link). First, this reduces the pilot workload. The pilot has no need to manually dictate how incoming messages are to be translated or constantly monitor the translation process. Furthermore, the plot need only have knowledge of how one platform operates, not how each platform that may send messages to for example, a F/A-18, operates. Second, this reduces the required user interface. By utilizing existing mission software and displays, the pilot merely has to learn the existing user interface and no new displays required for communicating with a particular platform.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE INVENTION

Figure 1:
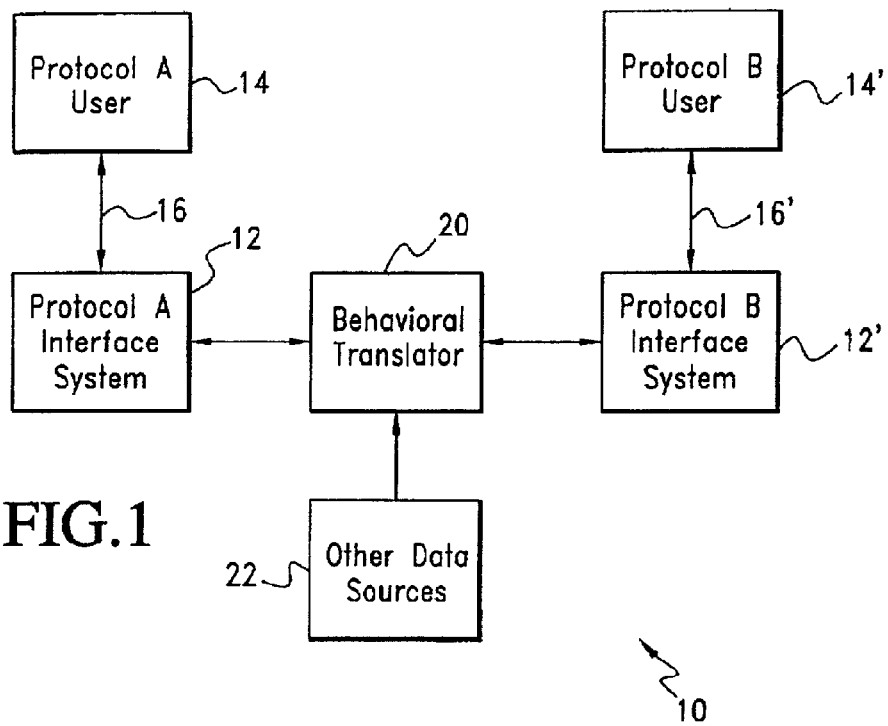
FIG. 1 is block diagram of the digital communication system as between two users.

Referring now to the drawings and the characters of reference marked thereon, FIG. 1 illustrates a preferred embodiment of the digital communication system (DCS) of the present invention, designated generally as 10, depicting operation between two users. The DCS (10) includes a first protocol interface system (12) in communication with a first user 14 for identifying a first message type of a first message (16) being passed between the first user 14 and the first protocol interface system (12). A second protocol interface system (12') in communication with a second user (14') identifies a second message type of a second message (16') being passed between the second user (14') and the second protocol interface system (12'). A behavioral translator (20) is in communication with the first protocol interface system (12) and the second protocol interface system (12') for receiving messages from either the first or the second protocol interface systems and performing behaviors sufficiently consistent with the users, based on the identifications of the first and second message types. This provides substantially seamless communication between the users (14, 14').

The users (14, 14') may be, for example, two aircraft, two ground stations, two ships, an aircraft and a ground station, an aircraft and a ship, or a ground station and a ship. Examples of ground stations include desktop computers or portable computers carried in a vehicle or by a person.

The protocol interface systems (12, 12'), maybe for example, a ground platform interface system such as a computer modem and a telephone line, an Ethernet card and cable, a military modem (such as an Improved Data Modem) and a radio, a computer serial port and a cable, an airborne protocol interface system, such as a military modem (such as an Improved Data Modem, a Link-16 terminal, or a Variable Message Format terminal) and a radio, or an Ethernet card and some satellite transceiver, or a maritime protocol interface system, such as a military modem (such as a Link-11 or Link-16 terminal) and a radio or satellite transceiver.

The behavioral translator (20), as will be described below, will typically be some piece of software that resides on a platform that may or may not be one of the users. One example of this is some avionics or processor box on an intermediary platform, such as a tactical operations center or a command and control aircraft, that receives messages from one set of users in one format, such as from Army helicopters, and translates those messages for use by some other set of users, such as Navy strike aircraft, and receives messages from the second set of users and translates them into messages for use by the first set. In this example, both sets of users would have a set of addresses that corresponds to users in their own group along with a set of addresses that corresponds to users in the other group. This way, for example, a specific Army helicopter can pass targeting information up to a specific set of Navy strike aircraft. Or, as another example, each set of users could have a set of addresses that corresponds to users in their own group and then use a single address for the intermediary platform. The intermediary would then process incoming messages addressed to it (or sent as broadcast messages), and decide how best to translate the messages. In both of these cases, since the software on the intermediary platform has knowledge of how both sets of users utilize their respective message sets, all of this translation can be performed without the need for human interaction, thereby reducing the workload of the human operators on the intermediary platform. Furthermore, since the incoming data appears to be from the same type of platform as the other users in that set, the workload for the pilots is reduced since they do not have to necessarily consciously remember who they are communicate with and the mission software on those platforms does not need to be modified to support the other type of platform.

Another example of this translation could be software that is hosted on some intermediary platform that is used to translate imagery from one format to another. Imagery that is used on strike platforms or by forces in the field must be sent quickly, does not require as much detail, and should be contained in smaller files than imagery that is processed by large, dedicated, ground-based facilities. As imagery is based around between large facilities, pipes that can handle large, complex, detailed imagery exist. However, when those same images must be sent to the actual platform (be it a strike aircraft or ground forces) that needs to execute a mission based on that imagery, the imagery must be altered to be sent over pipes that have limited bandwidth and to be handled by processors that require fewer details. Software could be written that would accept imagery addressed to a strike platform by a ground facility, perform any handshaking dictated by the protocol used by the ground facility to get the image transferred from the ground facility, convert the image to the format for use by the strike platform, and finally transfer the image to the strike platform, performing any handshaking dictated by the protocol used by the strike platform.

The behavioral translator (20) may receive data from data sources (22) other than the first and second protocol interface systems (12, 12') to perform behaviors sufficiently consistent with the first and second users (14, 14'), so as to provide substantially seamless communication between the users. Some examples of data sources include position data from a Global Positioning System or Inertial Navigation System, imagery or ranging data from an sensor, such as a laser target designator/range finder, radar, infrared camera, or an optical camera, or a populated lookup table, such as a waypoint/position table or a call sign or computer name/address table.

Figure 2:
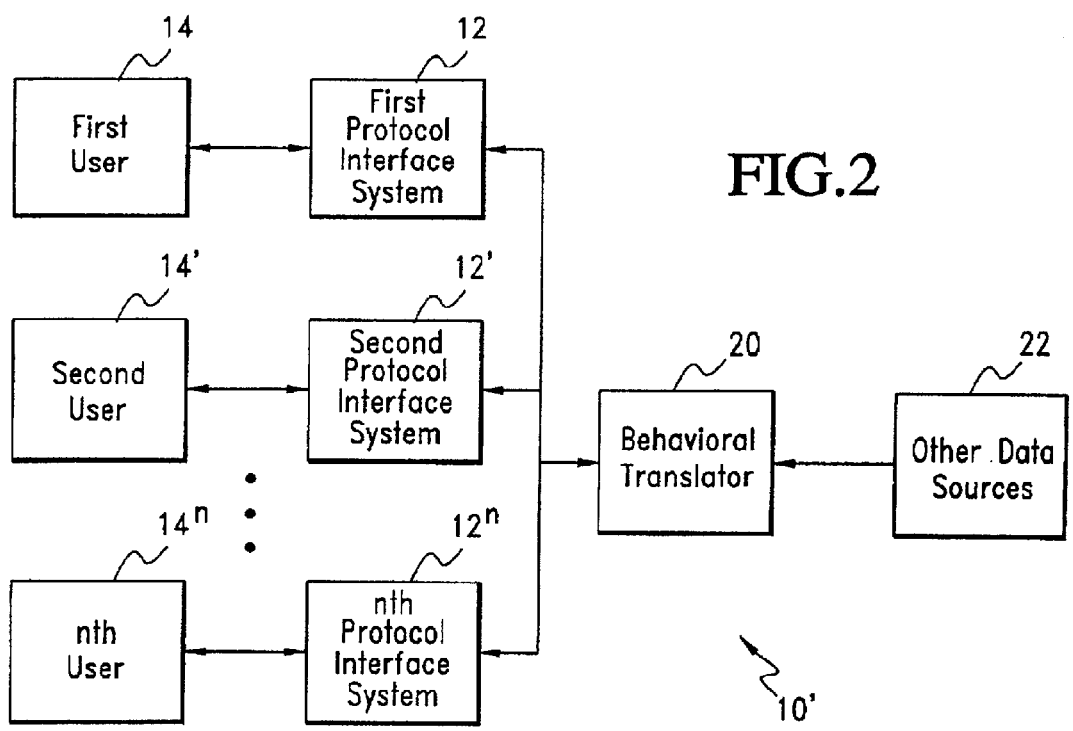
FIG. 2 is block diagram of the digital communication system as between multiple users.

Referring now to FIG. 2, a digital communication system (DCS) (10') is shown in which there are a number of different users (14, 14', 14", . . . 14''') and associated protocol interface systems (12, 12', 12", . . . 12'''). Some examples of this type of system include a forward air controller providing information to a flight of aircraft, an aircraft reporting information back to a battle group at sea, or a ground station broadcasting weather reports to commercial aircraft.

Figure 3A:
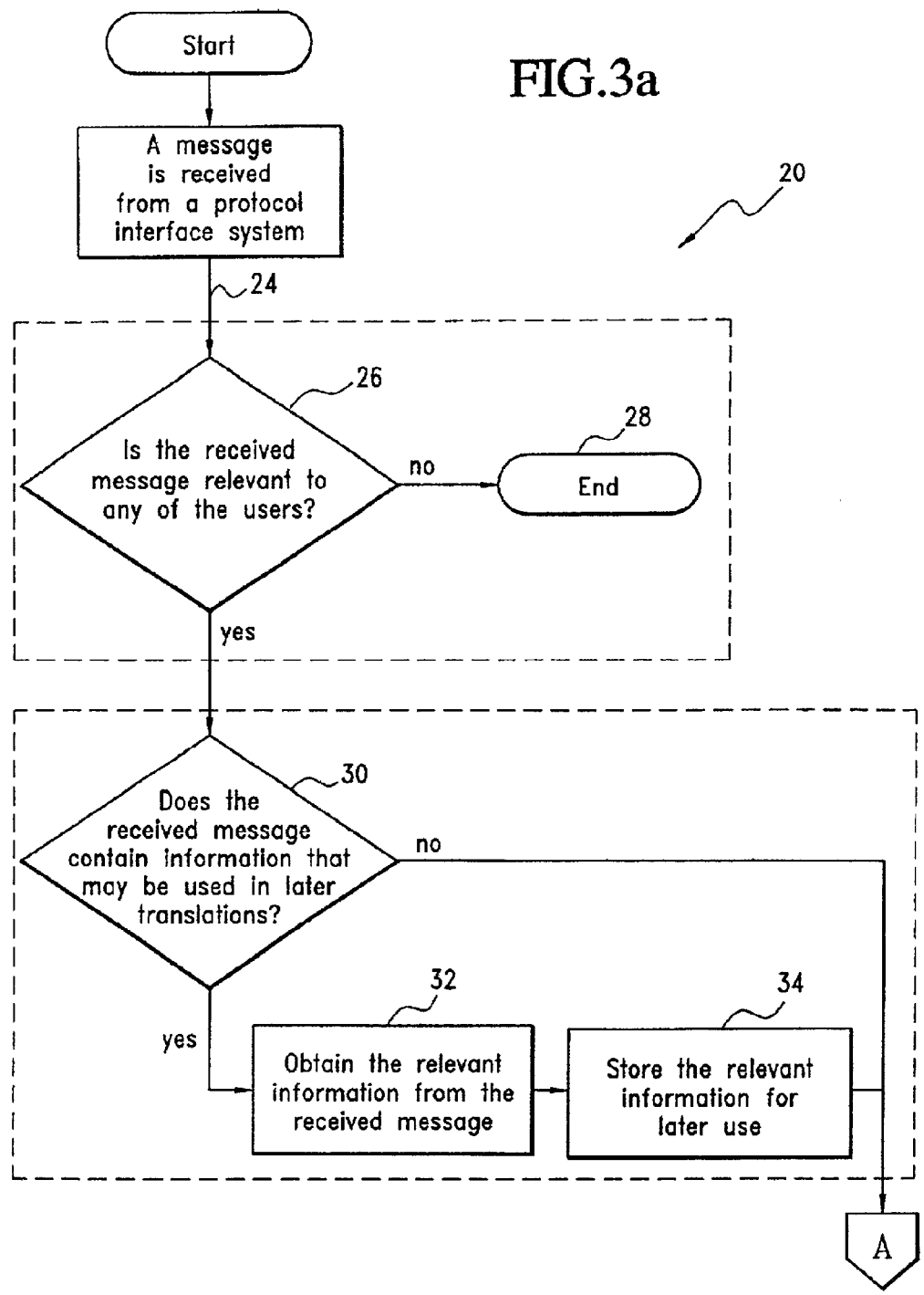
FIGS. 3a–3c are flow charts depicting the operation of the behavioral translator of the present system.
Figure 3B:
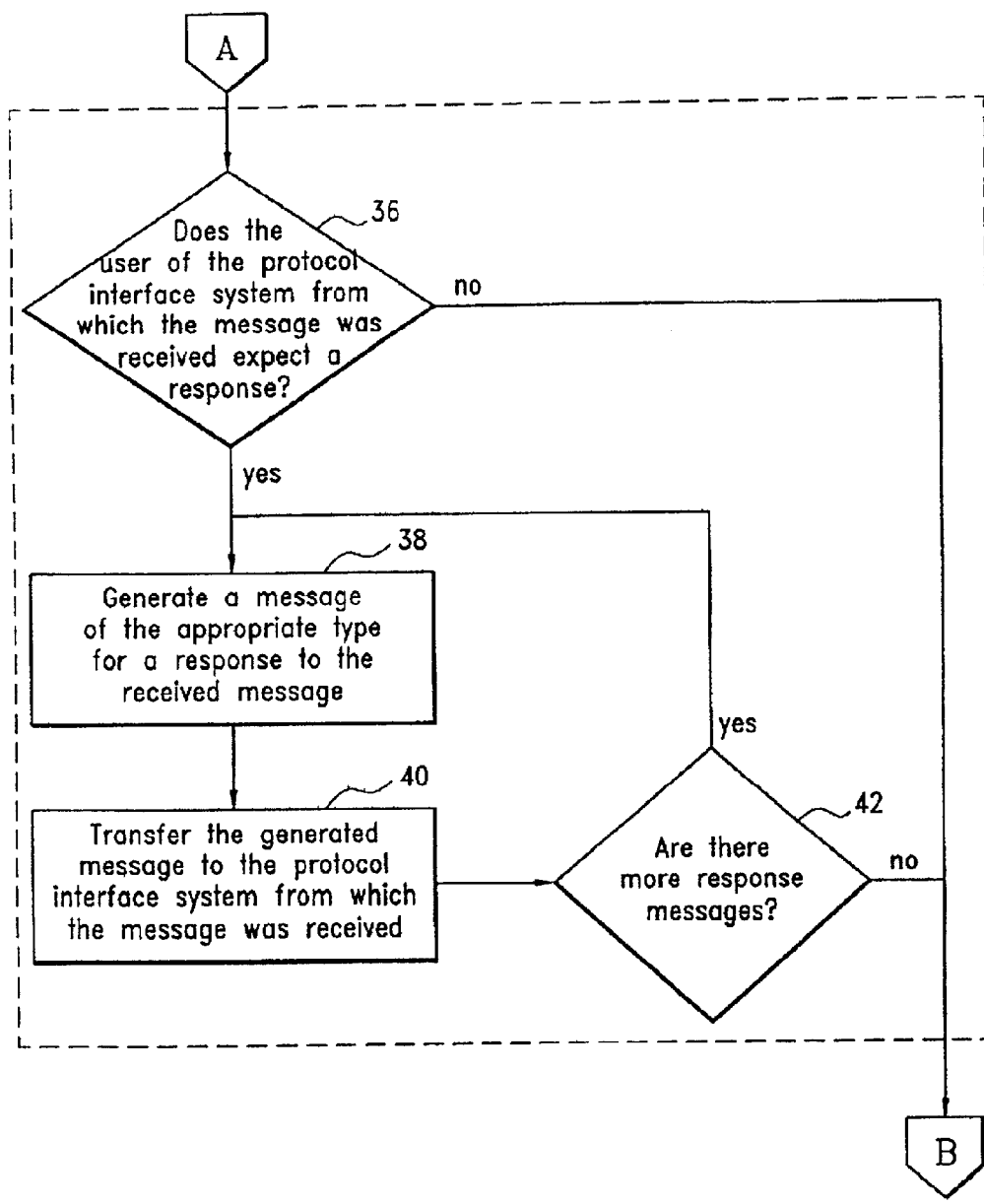
Figure 3C:
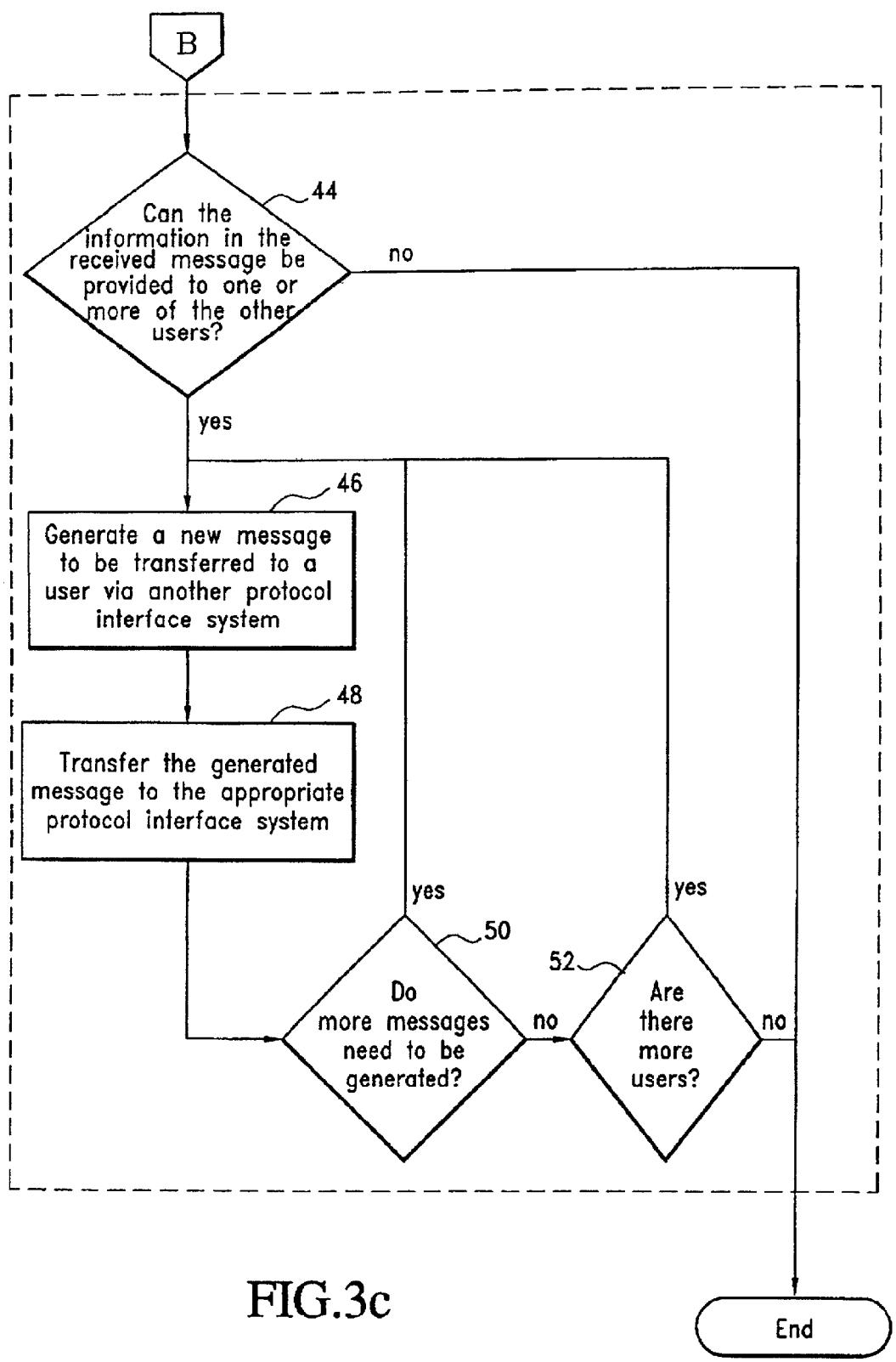

Referring now to FIGS. 3a–3c, the operation of the behavioral translator (20), is illustrated. The behavioral translator (20) first determines whether a received message (24) to the behavioral translator is relevant to any of the users, as denoted by decision block 26. It ignores the message if it is not relevant (28).

After determining that a received message is relevant, the behavioral translator (20) preferably performs the following steps:

It first determines if the information in the received message contains information that may be used in subsequent translations, as denoted by decision block 30. If it can be used, then the behavioral translator performs the steps of: a) obtaining the relevant information from the received message (32); and, b) storing the relevant information for later use (34).

The behavioral translator (20) then determines if the user of the protocol interface system from which the received message was received expects a response message in response to the received message, as denoted by decision block (36). If that user does so expect a response message, then the behavioral translator (20) performs the steps of: a) generating a response message, based on the received message (38); and, b) transferring the response message to the protocol interface system from which the received message was received so that it can be transferred to the user associated with that protocol interface system (40). The behavioral translator (20) then determines if there are more response messages (42).

When the user of the protocol interface system from which the message was received does not expect a response or there are no more response messages, the behavioral translator (20) determines if the information in the received message can be provided to at least one other of the users in a message supportable by those users, as shown by decision block (44). If it can be so provided, then the behavioral translator (20) performs the steps of: a) generating a new message to be transferred to the other user via that user's protocol interface system (46); and b) transferring the new message to that user's protocol interface system (48).

The behavioral translator (20) then determines whether more messages need to be generated, as noted by decision block (50). If not, there is a determination made as to whether there are more users, as noted by decision block (52).

Figure 4:
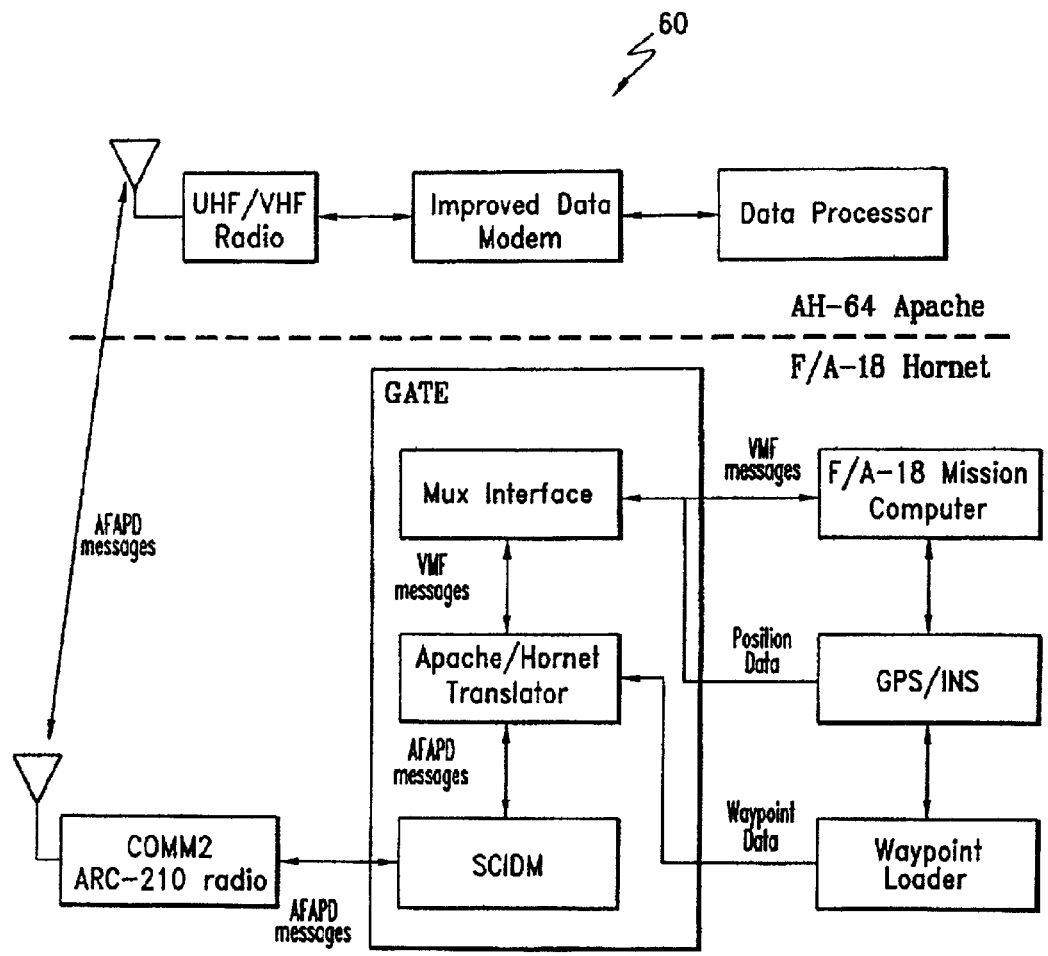
FIG. 4 shows implementation of the present invention in the communication between Apache and Hornet aircraft.

Referring now to FIG. 4, an example, designated generally as 60, of the implementation of the behavioral translator is illustrated relative to its use in the communication between Apache and Hornet aircraft. No new avionics will be installed on the Apache. A single avionics box will be installed on a Hornet between one of the radios and the mission computer. This piece of avionics will appear to the mission computer to be some other datalink that uses the Variable Message Format (protocol), but it will actually communicate with the Apache using the AFAPD protocol. Messages from the Apache will be received by the radio on the Hornet and processed by the avionics box. Certain messages, such as a request for status and position, will be handled by the avionics with no interaction with the mission computer or the pilot necessary. Other messages, such as a text message, will be converted from AFAPD to VMF and forwarded on to the mission computer. Messages to be transmitted will be received from the mission computer and processed by the avionics box. Certain messages, such as an on-station report, will cause one or more AFAPD messages to be generated and sent to the Apache. Other messages, such as a text message, will be converted from VMF to AFAPD and sent to the Apache.

The Data Processor (DP) on the Apache generates the data for an AFAPD message. It passes this data to the Improved Data Modem (IDM). The IDM converts the message into a serial stream of data to be transmitted via RF by a UHF/VHF radio on the Apache. The ARC-210 radio in the COMM2 slot of the Hornet receives the AFAPD message via RF and converts it into a serial stream of data. This data is passed to the Single-Channel Improved Data Modem (SCIDM), which is a board in the GATE (Gateway for Airborne Tactical-data Exchange) box. The serial data is decoded as an AFAPD message. This message is transferred to a General Purpose Processor board (GPP) board in GATE. The Apache/Hornet Translation (AHT) algorithm is running on this GPP. The SCIDM has already identified the type of message. The AHT algorithm uses that identification to determine how to handle the received message. The algorithm may translate the received AFAPD message into a received VMF message, which is then transferred to the Mux Interface so it can be provided to the F/A-18 Mission Computer (MC); it may generate some response (using data from various other received or transmitted message, or from other avionics, such as position data from the GPS/INS, or from preloaded data, such as converting waypoints from a name to a latitude/longitude pair) and send that AFAPD message back to the Apache; it may ignore the received AFAPD message; or it may have to perform some combination of the above. The basic goal is to "trick" the Apache into thinking it is talking to another Apache, and the Hornet into thinking it is talking to another Hornet.

The F/A-18 MC generates the data for a VMF message. It passes that data to the GATE box via the Mux Interface. The Mux Interface then transfers this transmitted VMF message to the AHT algorithm. Again, the Mux Interface has already identified the type of message. The AHT algorithm uses that identification to determine how to handle the message to be transmitted. The message may be translated into some AFAPD message and sent to the Apache, some simulated response may be generated (again, using data from various other received or transmitted messages) and transferred back to the MC, or the message may be ignored.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A digital communication system for providing communication between users utilizing digital communication protocols, comprising:
    a) a first protocol interface system in communication with a first user for identifying a first message type of a first message being passed between the first user and the first protocol interface system;
    b) a second protocol interface system in communication with a second user for identifying a second message type of a second message being passed between the second user and the second protocol interface system; and,
    c) a behavioral translator in communication with said first protocol interface system and said second protocol interface system for receiving messages from either said first or said second protocol interface systems and performing behaviors sufficiently consistent with said users, based on said identifications of said first and second message types, so as to provide substantially seamless communication between the users.

2. The digital communication system of claim 1, wherein said behavioral translator is capable of obtaining data from data sources other than said first and second protocol interface systems to perform behaviors sufficiently consistent with said first and second users, so as to provide substantially seamless communication between the users.

3. The digital communication system of claim 1, wherein said first protocol interface system and said second protocol interface system comprise different protocols.

4. The digital communication system of claim 1, wherein said first protocol interface system and said second protocol interface system comprise the same protocols.

5. The digital communication system of claim 1, further comprising a plurality of additional users having associated protocol interface systems in communication with said behavioral translator.

6. The digital communication system of claim 1, wherein said first protocol interface system comprises an airborne protocol interface system.

7. The digital communication system of claim 1, wherein said first protocol interface system comprises a ground platform protocol interface system.

8. The digital communication system of claim 1, wherein said behavioral translator performs the step of:
    determining whether a received message to the behavioral translator is relevant to any of the users and ignoring the message if it is not relevant.

9. The digital communication system of claim 8, wherein, after determining that a received message is relevant, said behavioral translator performs the steps of:
    determining whether the user of the protocol interface system from which said received message was received expects a response message in response to said received message, and if it does so expect a response message then said behavioral translator performs the steps of:
    a) generating a response message, based on the received message; and,
    b) transferring said response message to the protocol interface system from which the received message was received so that it can be transferred to the user associated with that protocol interface system.

10. The digital communication system of claim 8, wherein, after determining that a received message is relevant, said behavioral translator performs the steps of:

determining whether the information in the received message can be provided to at least another of the users in a message supportable by said at least another of the users, and if it can be provided, then said behavioral translator performs the steps of:
  a) generating a new message to be transferred to the other user via that user's protocol interface system; and,
  b) transferring said new message to that user's protocol interface system.

11. The digital communication system of claim 8, wherein, after determining that a received message is relevant, said behavioral translator performs the steps of:
  determining whether the user of the protocol interface system from which said received message was received expects a response message in response to said received message, and if it does so expect a response message, then said behavioral translator performs the steps of:
    a) generating a response message, based on the received message; and,
    b) transferring said response message to the protocol interface system from which the received message was received so that it can be transferred to the user associated with that protocol interface system; and,
  determining whether the information in the received message can be provided to at least another of the users in a message supportable by said at least another of the users, and if it can be provided, then said behavioral translator performs the steps of:
    a) generating a new message to be transferred to the other user via that user's protocol interface system; and,
    b) transferring said new message to that user's protocol interface system.

12. The digital communication system of claim 8, wherein, after determining that a received message is relevant, said behavioral translator performs the steps of:
  determining whether the information in the received message contains information that may be used in subsequent translations, and if it is can be used, then said behavioral translator performs the steps of:
    a) obtaining the relevant information from said received message; and,
    b) storing said relevant information for later use.

13. The digital communication system of claim 8, wherein, after determining that a received message is relevant, said behavioral translator performs the steps of:
  determining whether the information in the received message contains information that may be used in subsequent translations, and if it is can be used, then said behavioral translator performs the steps of:
    a) obtaining the relevant information from said received message; and,
    b) storing said relevant information for later use; and,
  determining whether the user of the protocol interface system from which said received message was received expects a response message in response to said received message, and if it does so expect a response message, then said behavioral translator performs the steps of:
    a) generating a response message, based on the received message; and,
    b) transferring said response message to the protocol interface system from which the received message was received so that it can be transferred to the user associated with that protocol interface system.

14. The digital communication system of claim 8, wherein, after determining that a received message is relevant, said behavioral translator performs the steps of:
  determining whether the information in the received message contains information that may be used in subsequent translations, and if it is can be used, then said behavioral translator performs the steps of:
    a) obtaining the relevant information from said received message; and,
    b) storing said relevant information for later use; and,
  determining whether the information in the received message can be provided to at least another of the users in a message supportable by said at least another of the users, and if it can be provided, then said behavioral translator performs the steps of:
    a) generating a new message to be transferred to the other user via that user's protocol interface system; and,
    b) transferring said new message to that user's protocol interface system.

15. The digital communication system of claim 8, wherein, after determining that a received message is relevant, said behavioral translator performs the steps of:
  determining whether the information in the received message contains information that may be used in subsequent translations, and if it can be used, then said behavioral translator performs the steps of:
    a) obtaining the relevant information from said received message; and,
    b) storing said relevant information for later use; and,
  determining whether the user of the protocol interface system from which said received message was received expects a response message in response to said received message, and if it does so expect a response message, then said behavioral translator performs the steps of:
    a) generating a response message, based on the received message; and,
    b) transferring said response message to the protocol interface system from which the received message was received so that it can be transferred to the user associated with that protocol interface system; and,
  determining whether the information in the received message can be provided to at least another of the users in a message supportable by said at least another of the users, and if it can be provided, then said behavioral translator performs the steps of:
    a) generating a new message to be transferred to the other user via that user's protocol interface system; and,
    b) transferring said new message to that user's protocol interface system.

16. The digital communication system of claim 9, wherein, a plurality of response messages are generated and transferred to the protocol interface from which the received messages were received so that they can be transferred to the user associated with that protocol interface system.

17. The digital communication system of claim 10, wherein, a plurality of new messages are generated and transferred to the other user via that other user's protocol interface system.

18. The digital communication system of claim 10, wherein, said new message is generated and transferred to a plurality of other users via those other users' protocol interface systems.

19. The digital communication system of claim 10, wherein, a plurality of new messages are generated and transferred to a plurality of other users via those other users' protocol interface systems.

20. A digital communication system for providing communication between users utilizing digital communication protocols, comprising:

a) a first protocol interface system in communication with a first user for identifying a first message type of a first message being passed between the first user and the first protocol interface system;

b) a second protocol interface system in communication with a second user for identifying a second message type of a second message being passed between the second user and the second protocol interface system, said second protocol interface system using a different protocol than said first protocol interface system; and, c) a behavioral translator in communication with said first protocol interface system and said second protocol interface system for receiving messages from either said first or said second protocol interface systems and performing behaviors sufficiently consistent with said users, based on said identifications of said first and second message types, so as to provide substantially seamless communication between the users, wherein said behavioral translator performs the steps of:

i) determining whether a received message to the behavioral translator is relevant to any of the users and ignoring the message if it is not relevant;

ii) determining whether the user of the protocol interface system from which said received message was received expects a response message in response to said received message, and if it does so expect a response message, then said behavioral translator performs the steps of:

a) generating a response message, based on the received message; and, b) transferring said response message to the protocol interface system from which the received message was received so that it can be transferred to the user associated with that protocol interface system; and, iii) determining whether the information in the received message can be provided to at least another of the users in a message supportable by said at least another of the users, and if it can be provided, then said behavioral translator performs the steps of:

a) generating a new message to be transferred to the other user via that user's protocol interface system; and, b) transferring said new message to that user's protocol interface system.

21. A method for providing communication between users utilizing digital communication protocols, comprising the steps of:

a) identifying a first message type of a first message being passed between a first user and a first protocol interface system;

b) identifying a second message type of a second message being passed between a second user and a second protocol interface system; and, c) utilizing a behavioral translator in communication with said first protocol interface system and said second protocol interface system for receiving messages from either said first or said second protocol interface systems and performing behaviors sufficiently consistent with said users, based on said identifications of said first and second message types, so as to provide substantially seamless communication between the users.

* * * * *